(12) United States Patent
Decker et al.

(10) Patent No.: US 7,589,608 B2
(45) Date of Patent: Sep. 15, 2009

(54) LOCKING DEVICE FOR VEHICLES, IN PARTICULAR FOR AEROPLANES

(75) Inventors: Walter Decker, Windsbach (DE);
Alexander Eck, Poppenhausen (DE);
Klaus Dieter Schmitt, Würzburg (DE);
Jörg-Peter Mehring, Tauberrettersheim (DE)

(73) Assignee: Wittenstein AG (DE)

( * ) Notice: Subject to any disclaimer, the term of this patent is extended or adjusted under 35 U.S.C. 154(b) by 265 days.

(21) Appl. No.: 10/523,545

(22) PCT Filed: May 22, 2003

(86) PCT No.: PCT/EP03/05363

§ 371 (c)(1),
(2), (4) Date: Aug. 4, 2005

(87) PCT Pub. No.: WO2004/018805

PCT Pub. Date: Mar. 4, 2004

(65) Prior Publication Data

US 2006/0060708 A1   Mar. 23, 2006

(30) Foreign Application Priority Data

Aug. 15, 2002 (DE) ............................... 102 38 153

(51) Int. Cl.
*H01F 7/00* (2006.01)
*H01F 7/08* (2006.01)

(52) U.S. Cl. ........................................ 335/229; 335/220
(58) Field of Classification Search ......... 335/220–229; 310/77, 93, 75 R, 112; 70/275–277
See application file for complete search history.

(56) References Cited

U.S. PATENT DOCUMENTS

| 4,289,996 | A  | * | 9/1981 | Barnes et al. ............... 318/38 |
| 4,470,030 | A  | * | 9/1984 | Myers ...................... 335/228 |
| 4,915,326 | A  | * | 4/1990 | Plude ..................... 244/129.5 |
| 6,310,455 | B1 | * | 10/2001 | Siraky et al. ............... 318/560 |
| 6,414,577 | B1 | * | 7/2002 | Hoffman ................... 335/229 |
| 6,507,257 | B2 | * | 1/2003 | Mohler .................... 335/220 |
| 2002/0057152 | A1 | * | 5/2002 | Elferich et al. ............. 335/220 |
| 2006/0119110 | A1 | * | 6/2006 | Krause .................... 292/251.5 |
| 2006/0220391 | A1 | * | 10/2006 | Baragano Gonzalez ..... 292/194 |

* cited by examiner

*Primary Examiner*—Elvin G Enad
*Assistant Examiner*—Bernard Rojas
(74) *Attorney, Agent, or Firm*—Bachman & LaPointe, P.C.

(57) ABSTRACT

A locking device for vehicles, especially for aeroplanes, comprising an actively driven drive element provided with an input shaft and an output shaft which is directly or indirectly connected to the input shaft. According to the invention, at least one permanent magnet is associated with the input shaft or the output shaft, the magnet interacting with at least one other external fixed element, especially a permanent magnet.

11 Claims, 1 Drawing Sheet

LOCKING DEVICE FOR VEHICLES, IN PARTICULAR FOR AEROPLANES

BACKGROUND OF THE INVENTION

The invention relates to a locking device for vehicles, in particular for aircraft having an actively driven drive element with an input drive shaft and an output drive shaft connected directly or indirectly to it.

Conventionally, locking devices are known which lock and/or unlock doors, aircraft doors or the like by means of a motor element, followed by a complex transmission element and redundant mechanical springs connected to it. Locking devices such as these form a security mechanism and mechanically operate appropriate safety bolts or the like in response to appropriate signals. Conventional locking devices have the disadvantage that they are very heavy, complex to manufacture and require intensive maintenance for their operation. Furthermore, in some cases, they are unreliable, which is undesirable. Furthermore, they require a large installation area which is likewise undesirable, with a very high natural weight.

The U.S. Pat. No. 6,310,455 B1 discloses a positioning and actuating drive which operates with a DC electric motor. In this case, a rotor is mounted coaxially in a stator such that it can rotate, and drives a transmission. In this case, the transmission and the motor have corresponding associated position angle sensors, motor angle sensors, which identify and determine the position exactly.

The present invention is thus based on the object of providing a locking device of the type mentioned initially, which overcomes the stated disadvantages and by means of which the reliability and the operability of the locking devices are intended to be significantly improved. A further aim is to save manufacturing costs and maintenance costs, while reducing the natural weight.

SUMMARY OF THE INVENTION

The is achieved by providing a locking device for vehicles, in particular for aircraft, having an actively driven drive element with an input drive shaft and an output drive shaft connected directly or indirectly to it, characterized in that the input drive shaft or the output drive shaft has at least one associated permanent magnet which interacts with at least one further external stationary element, in particular a permanent magnet.

The present invention, a drive element is, for example, in the form of an electric motor, but may also be of a pneumatic, hydraulic or electromechanical type. The present invention is not restricted to this.

In this case, the present invention has been found to be particularly advantageous for this purpose, in particular in order to improve the reliability, to provide a magnetically operated resetting for the output drive shaft or the input drive shaft to a rest or safe position in the event of a failure or if the drive element is switched off, which rest or safe position can be selected. The locking device is thus preferably formed from two components, with an active drive element and a passive part, which are coupled to one another. The passive part is formed from two permanent magnets, with one permanent magnet being connected to the input and/or output drive shaft, and the other permanent magnet being firmly connected to the housing. The two permanent magnets preferably engage with one another, so that, particularly in the event of failure of the drive element, the input or output drive shaft can automatically be mechanically moved to a safe position. The drive element can move the input drive shaft or the output drive shaft to different, selectable angles, which can be set precisely, up to 360° with respect to stops or hard stops which are not illustrated here. If the active drive element is deactivated, then the passive permanent magnets ensure that the shaft output or the output drive shaft is moved back to its original initial position. The two permanent magnets in the passive part are preferably in the form of a stator and rotor, with a magnetic resetting torque being produced between them. This contributes considerably to the security and reliability of the locking device in operation, in particular for aircraft doors.

BRIEF DESCRIPTION OF THE DRAWINGS

Further advantages, features and details of the invention will become evident from the following description of preferred exemplary embodiments and from the drawing, in which.

DETAILED DESCRIPTION

Figure 1:
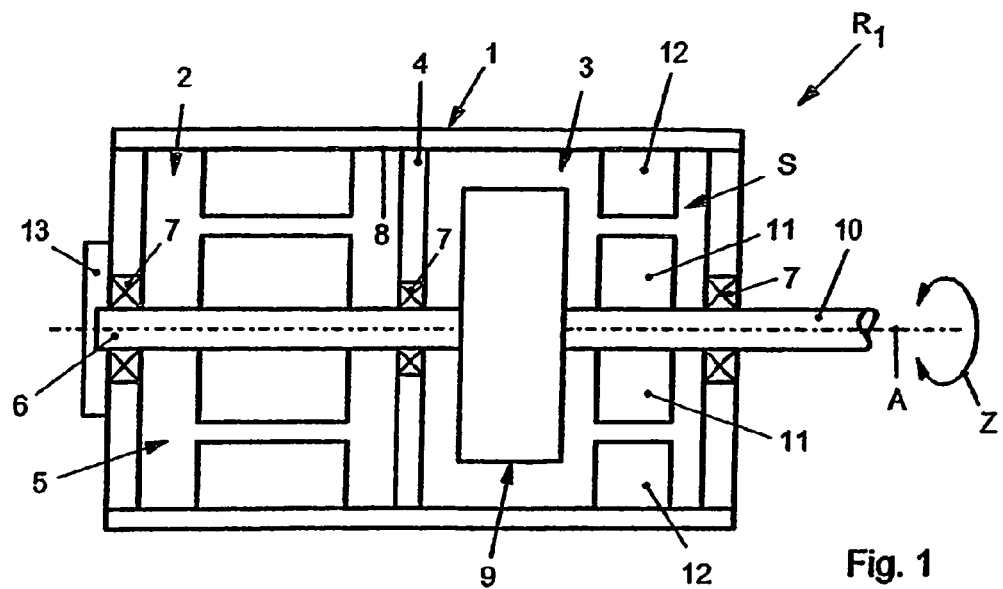
FIG. 1 shows a schematically illustrated longitudinal section through a locking device according to the invention for vehicles.

As is shown in FIG. 1, a locking device $R_1$ according to the invention for vehicles, in particular for aircraft, has a housing 1 which, in the present exemplary embodiment, is subdivided by means of a partition wall 4 into a first part 2 and a second part 3. A drive element 5, preferably in the form of an electric motor, is connected to an input drive shaft 6 within the first part 2 of the housing 1. The input drive shaft 6 is mounted by means of bearings 7. In the preferred exemplary embodiment, the active part of the drive element 5, which is preferably in the form of an electrically powered motor, is located within a cylindrical inner wall 8 of the housing 1. However, the scope of the present invention is also intended to cover at least partially, a rotary movement of the input drive shaft 6 the active use of pneumatically or hydraulically powered motor elements.

The present invention is not restricted to this.

Following the input drive shaft 6, a transmission element 9 is connected in the second housing part 3 to the drive element 5, in particular to the input drive shaft 6. The transmission element 9 is preferably in the form of an epicyclic transmission with a sun wheel and sun wheels. The output drive shaft 10 is connected to the transmission element 9. Particularly for the locking device $R_1$, the output drive shaft 10 is pivoted about an axis A to selectable specific angles in order to operate corresponding locking elements, which are not illustrated here, with a slide or the like. By way of example, if the drive element 5 fails, for example as a result of a power failure or failure of a hydraulic pump, then it is important in the case of the present invention for the output drive shaft 10 to move back to its original initial position in order to ensure a specific locking state. For this purpose, in the case of the present invention, it has been found to be particularly advantageous for an inner permanent magnet 11 to be associated with the output drive shaft 10, and to be firmly seated on the output drive shaft 10. A further permanent magnet 12 is firmly connected to the housing 1 within the cylindrical inner wall 8, located axially at approximately the same height. A gap S is formed between the permanent magnet 11 and the permanent magnet 12.

At least one permanent magnet 11 (and preferably a number of permanent magnets 11) is or are radially distributed and is or are permanently associated with the output drive shaft 10, and this or these interacts or interact with at least one passive outer permanent magnet 12 on the housing 1. By way of example, if the drive element 5 fails or is switched off, then the magnetic flux between the permanent magnets 11 and 12 rotates the output drive shaft 10 back to a selectable rest or safe position and, by way of example, secures a lock on an aircraft door or the like.

Furthermore, it is intended to be within the scope of the present invention for elements composed of metal or the like, which then interact with the permanent magnets 12, to be arranged on the input drive shaft 6 and/or on the output drive shaft 10 instead of on the permanent magnets 11.

This allows the reliability, in particular the operational reliability, of locking devices to be considerably improved.

Figure 2:
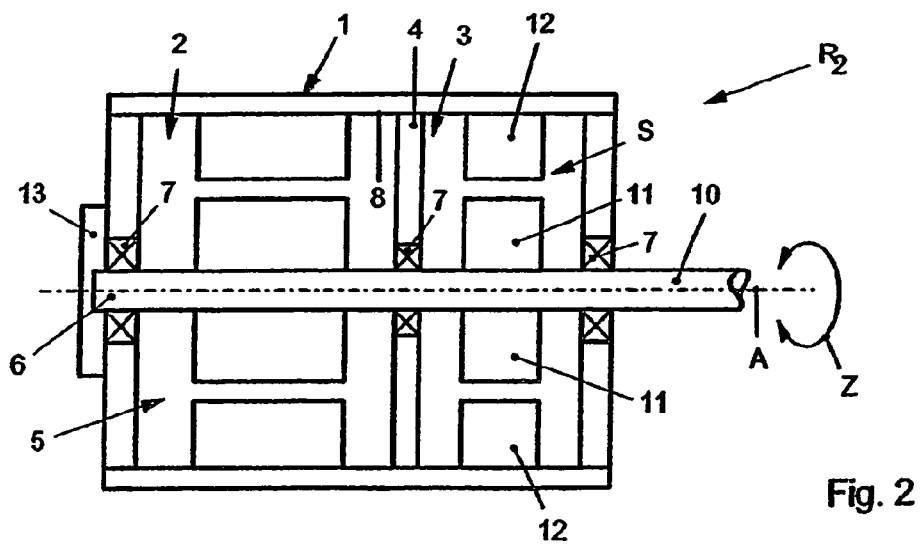
FIG. 2 shows a schematically illustrated longitudinal section through a further exemplary embodiment of a locking device as shown in FIG. 1.

In a further exemplary embodiment of the present invention, FIG. 2 shows a locking device $R_2$ in which the locking device $R_2$ is formed from components comprising a housing 1, a drive element 5, an input drive shaft 6 and an output drive shaft 10. There is no transmission element 9 in this exemplary embodiment. In this case, the input drive shaft 6 and the output drive shaft 10 coincide. In the present exemplary embodiment, at least one permanent magnet 11 can be associated directly with the drive element 5, in particular the input drive shaft 6 and the output drive 10, and interacts with at least one radially aligned outer permanent magnet 12, which is associated with the cylinder inner wall 8, in the manner described above, in order, for example, to move the input drive shaft 6 and the output drive shaft 10 back to a selectable safe or initial position in the event of failure of the drive element 5. In this case, it is also intended to be within the scope of the present invention for the permanent magnet 12 and/or 11 to be a component of the drive element 5.

Figure 3:
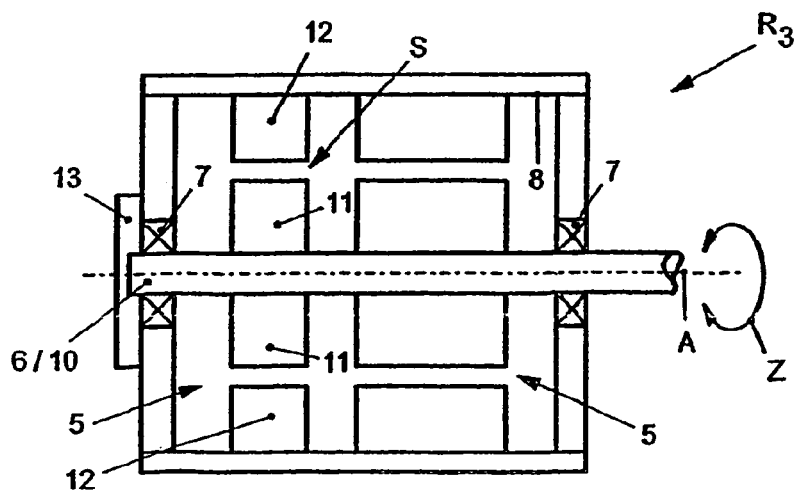
FIG. 3 shows a schematically illustrated longitudinal section through a further exemplary embodiment of the locking device as shown in FIG. 2.

The exemplary embodiment of the present invention in FIG. 3 shows a locking device $R_3$ in which the permanent magnets 11 and 12 are connected upstream of or precede the drive element 5, merely in comparison to the exemplary embodiment shown in FIG. 2.

It is also intended to be within the scope of the present invention for at least one sensor 13 to be provided in order to identify limit positions of the input and/or output drive shafts 6, 10. Stop elements or the like, which are not illustrated here, can be provided in order to limit the rotary movement of the input drive shaft 6 and/or output drive shaft 10.

| Item number list | |
|---|---|
| 1 | Housing |
| 2 | Part |
| 3 | Part |
| 4 | Partition wall |
| 5 | Drive element |
| 6 | Input drive shaft |
| 7 | Bearing |
| 8 | Cylindrical inner wall |
| 9 | Transmission element |
| 10 | Output drive shaft |
| 11 | Permanent magnet |
| 12 | Permanent magnet |
| 13 | Sensor |
| 14 | |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| $R_1$ | Lock |
| $R_2$ | Lock |
| $R_3$ | Lock |
| A | Axis |
| S | Gap |
| Z | Rotation direction |

The invention claimed is:

1. A locking device for vehicles having drive means rotatably mounted in a housing, said drive means comprises a drive element, an input drive shaft, and an output drive shaft connected to the input drive shaft, first magnet means associated with said drive means and second magnet means, wherein, in the event of a power cut off to the drive element, the first magnet means acts on the second magnet means to rotate one of the input drive shaft and the output drive shaft to a variable and selectable safe rest position.

2. A locking device according to claim 1, wherein the drive element is selected from an electric motor, a pneumatic drive, and a hydraulic drive.

3. A locking device according to claim 1, wherein the first and second magnet means are permanent magnets.

4. A locking device according to claim 1, wherein the first magnet means is associated with the input drive shaft.

5. A locking device according to claim 1, wherein the first magnet means is associated with the output drive shaft.

6. A locking device according to claim 1, wherein the second magnet means is associated with the housing.

7. A locking device according to claim 1, wherein the second magnet means is mounted on an internal wall of the housing.

8. A locking device according to claim 1, wherein the first magnet means defines with the second magnet means a gap therebetween.

9. A locking device according to claim 1, wherein the housing is subdivided by a partition into a first part and a second part, wherein the drive element is in the first part and the first and second magnet means in the second part.

10. A locking device according to claim 1, wherein a position determination sensor element is associated with at least one of input drive shaft and the output drive shaft.

11. A locking device according to claim 1, wherein an epicyclic transmission is connected between the input drive shaft and the output drive shaft.

* * * * *

UNITED STATES PATENT AND TRADEMARK OFFICE
CERTIFICATE OF CORRECTION

PATENT NO. : 7,589,608 B2
APPLICATION NO. : 10/523545
DATED : September 15, 2009
INVENTOR(S) : Decker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this

Twenty-first Day of September, 2010

David J. Kappos
*Director of the United States Patent and Trademark Office*